United States Patent [19]
Beckman et al.

[11] Patent Number: 5,882,039
[45] Date of Patent: Mar. 16, 1999

[54] HYDROFORMED ENGINE CRADLE AND CROSS MEMBER FOR VEHICLE BODY AND FRAME ASSEMBLY

[75] Inventors: John A. Beckman, Wernersville; Richard A. Marando, Bernville, both of Pa.

[73] Assignee: Dana Corporation, Toledo, Ohio

[21] Appl. No.: 787,637

[22] Filed: Jan. 23, 1997

[51] Int. Cl.[6] .................................................. B62D 21/00
[52] U.S. Cl. .......................... 280/781; 280/785; 280/796; 280/797; 280/798; 180/311
[58] Field of Search .................. 280/781, 785, 280/796, 797, 798, 800; 180/311

[56] References Cited

U.S. PATENT DOCUMENTS

| | | | |
|---|---|---|---|
| 1,992,710 | 2/1935 | Matthaei | 29/152 |
| 2,880,013 | 3/1959 | Dean | 280/106 |
| 3,176,786 | 4/1965 | Seidl | 180/70 |
| 4,488,732 | 12/1984 | Lehmann et al. | 280/781 |
| 4,567,743 | 2/1986 | Cudini | 72/61 |
| 4,744,237 | 5/1988 | Cudini | 72/61 |
| 5,005,864 | 4/1991 | Chachere | 280/800 |
| 5,107,693 | 4/1992 | Olszewski et al. | 72/58 |
| 5,332,281 | 7/1994 | Janotik et al. | 296/209 |
| 5,339,667 | 8/1994 | Shah et al. | 72/58 |
| 5,364,128 | 11/1994 | Ide | 280/784 |
| 5,398,533 | 3/1995 | Shimanovski et al. | 72/55 |
| 5,454,453 | 10/1995 | Meyer et al. | 180/377 |
| 5,557,961 | 9/1996 | Ni et al. | 72/61 |
| 5,720,092 | 2/1998 | Ni et al. | 29/421.1 |

*Primary Examiner*—J. Woodrow Eldred
*Attorney, Agent, or Firm*—MacMillan, Sobanski & Todd, LLC

[57] ABSTRACT

A combined engine cradle and cross member structure for use with a vehicular body and frame assembly is lighter in weight than known structures. The engine cradle is formed from tubular stock material using mechanical bending and hydroforming techniques to have a generally U-shaped configuration including a central portion having a pair of leg portions extending therefrom. The cross member is also formed from tubular stock material using hydroforming techniques and has a pair of end portions. The end portions of the tubular cross member are secured to the leg portions of the tubular cradle to form the combined engine cradle and cross member structure. To accomplish this, the end portions of the tubular cross member may have notches formed therein which receive the leg portions of the engine cradle therein. The end portions of the cross member may be secured to the leg portions of the engine cradle in any conventional manner, such as by welding.

13 Claims, 4 Drawing Sheets

HYDROFORMED ENGINE CRADLE AND CROSS MEMBER FOR VEHICLE BODY AND FRAME ASSEMBLY

BACKGROUND OF THE INVENTION

This invention relates in general to body and frame assemblies for vehicles. More specifically, this invention relates to an improved structure for a combined engine cradle and cross member structure for use with such a vehicular body and frame assembly.

Virtually all land vehicles in common use, such as automobiles, vans, and trucks, include a body and frame assembly which is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modem vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modern vehicles, such as automobiles and minivans.

In both types of body and frame assemblies, it is known to provide a specialized structure for supporting the engine of the vehicle thereon. This engine support structure, which is commonly referred to as an engine cradle, is frequently embodied as a generally U-shaped member having a central portion and a pair of leg portions. Engine mount portions and body mount portions formed at various locations on the engine cradle. The engine mount portions are provided for facilitating the connection of the engine to the cradle, while the body mount portions are provided for facilitating the connection of the cradle to the body and frame assembly. Usually, bolts or similar fasteners are used to provide the various connections between the engine, the cradle, and the body and frame assembly. Thus, the engine cradle securely supports the engine on the body and frame assembly of the vehicle during use.

In the past, an engine cradle was usually formed by securing a number of individual components into a desired configuration. Typically, these individual components were metallic pieces which were stamped or otherwise shaped as desired, then welded together to form the final engine cradle. Engine cradles having this general structure have been found to be effective, but are relatively time consuming and expensive to manufacture because of the large number of individual components involved. More recently, engine cradles have been formed from a single tubular component using the process of expansion shaping, commonly referred to as hydroforming. Hydroforming is a well known process which uses pressurized fluid to deform a tubular member into a desired shape. To accomplish this, the tubular member is initially disposed between two die sections of a hydroforming apparatus which, when closed together, define a die cavity having a desired final shape. Thereafter, the tubular member is filled with a pressurized fluid, typically a relatively incompressible liquid such as water. The pressure of the fluid is increased to a magnitude where the tubular member is expanded outwardly into conformance with the die cavity. As a result, the tubular member is deformed into the desired final shape. Hydroforming is an advantageous process for forming engine cradles and other structures because it can quickly deform a single component into a desired shape.

Regardless of whether the engine cradle is formed from a number of individual welded components or from a single hydroformed component, it is often desirable to secure a cross member between the two leg portions of the engine cradle adjacent to the ends thereof. The cross member provides desirable lateral and torsional rigidity to the engine cradle as a whole. In the past, cross members for engine cradles have been formed from flat metallic members which have been stamped or otherwise shaped as desired. Although known cross members for engine cradles have been effective, it has been found that they must be formed from relatively heavy pieces of material in order to provide the desired lateral and torsional rigidity. As is well known, weight reduction is an important goal in the design of virtually all components contained in vehicles. Thus, it would be desirable to provide an improved structure for an engie cradle having a cross member secured thereto which is lighter in weight than known combined engine cradle and cross member structures, but which provides the necessary lateral and torsional rigidity thereto.

SUMMARY OF THE INVENTION

This invention relates to an improved structure for a combined engine cradle and cross member structure for use with a vehicular body and frame assembly which is lighter in weight than known structures. The engine cradle is formed from tubular stock material using mechanical bending and hydroforming techniques to have a generally U-shaped configuration including a central portion having a pair of leg portions extending therefrom. The cross member is also formed from tubular stock material using hydroforming techniques and has a pair of end portions. The end portions of the tubular cross member are secured to the leg portions of the tubular cradle to form the combined engine cradle and cross member structure. To accomplish this, the end portions of the tubular cross member may have notches formed therein which receive the leg portions of the engine cradle therein. The end portions of the cross member may be secured to the leg portions of the engine cradle in any conventional manner, such as by welding.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
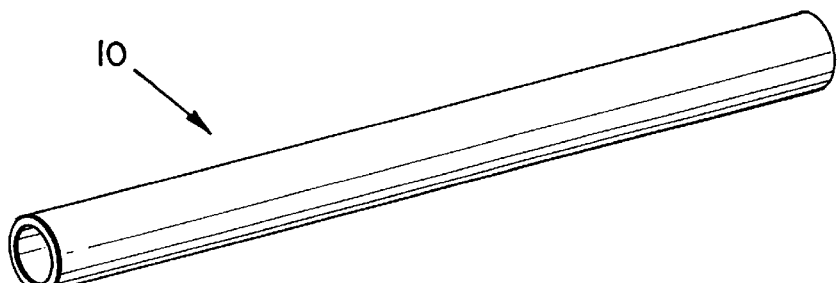
FIG. 1 is a perspective view of a hollow tubular member which can be used to form an engine cradle in accordance with this invention.

Referring now to the drawings, there is illustrated in FIG. 1 a hollow tubular member, indicated generally at 10, which can be used to form an engine cradle in accordance with this invention. Although the illustrated member 10 is tubular in cross sectional shape, it will be appreciated that the member 10 may be formed having other cross sectional shapes if desired. The tubular member 10 is preferably formed from a rigid deformable material, such as metal, having a length and wall thickness which is appropriate for the particular application for the engine cradle to be formed.

Figure 2:
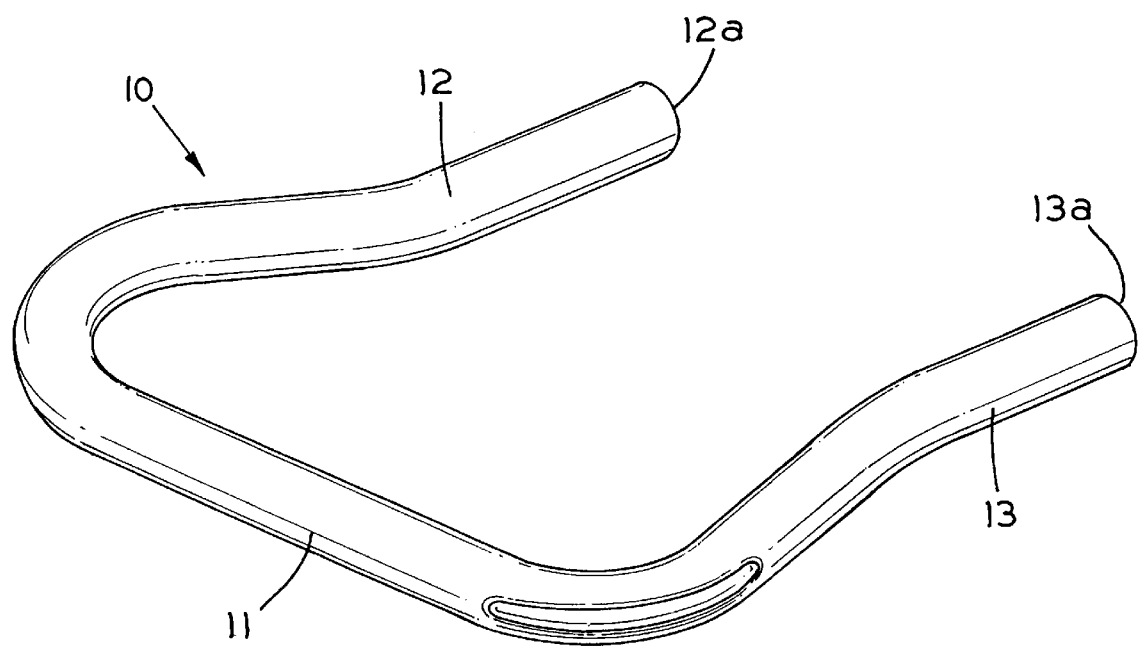
FIG. 2 is a perspective view of the hollow tubular member illustrated in FIG. 1 after having been preliminarily deformed in a tube bending apparatus.

As shown in FIG. 2, the tubular member 10 is initially deformed to have a generally U-shaped configuration defined by a center portion 11 having a pair of leg portions 12 and 13 extending therefrom. The leg portions 12 and 13 terminate in respective hollow cylindrical ends 12a and 13a. The tubular member 10 can be deformed into this U-shaped configuration using a conventional mechanical tube bending apparatus. After this preliminary deformation of the tubular member 10 has been accomplished, the cross sectional shape of the tubular member 10 is still generally circular throughout its entire length. However, certain portions (particularly near the relatively sharp corners between the center portion 11 and the two leg portions 12 and 13) may be folded inwardly to a certain extent as a result of the mechanical bending process.

The deformed tubular member 10 is next subjected to a hydroforming process. As discussed above, hydroforming is a well known process which uses pressurized fluid to deform a tubular member 10 into a desired shape. To accomplish this, the tubular member 10 is initially disposed between two die sections of a hydroforming apparatus which, when closed together, define a die cavity having a desired final shape. Although the die cavity is usually somewhat larger than the tubular member 10 itself and non-circular in cross sectional shape, the closure of the two die sections may, in some instances, cause some mechanical deformation of the tubular member 10. Thereafter, the tubular member 10 is filled with a pressurized fluid, typically a relatively incompressible liquid such as water. The pressure of the fluid is increased to a magnitude where the tubular member 10 is expanded outwardly into conformance with the die cavity.

Figure 3:
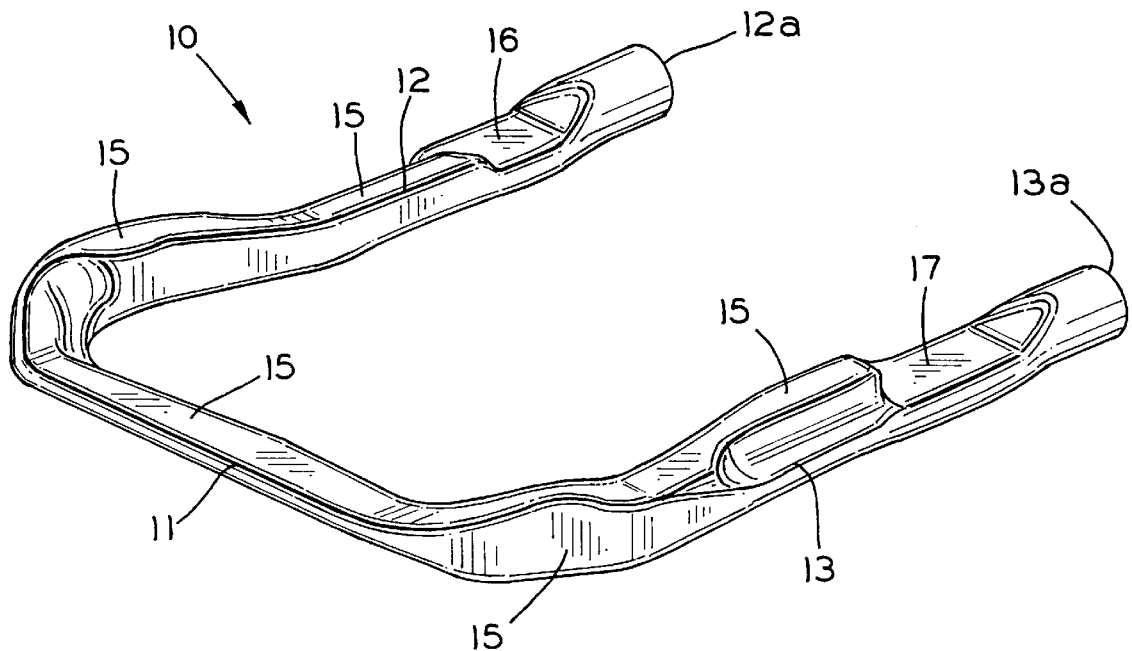
FIG. 3 is a perspective view of the hollow tubular member illustrated in FIG. 2 after having been hydroformed.
Figure 4:
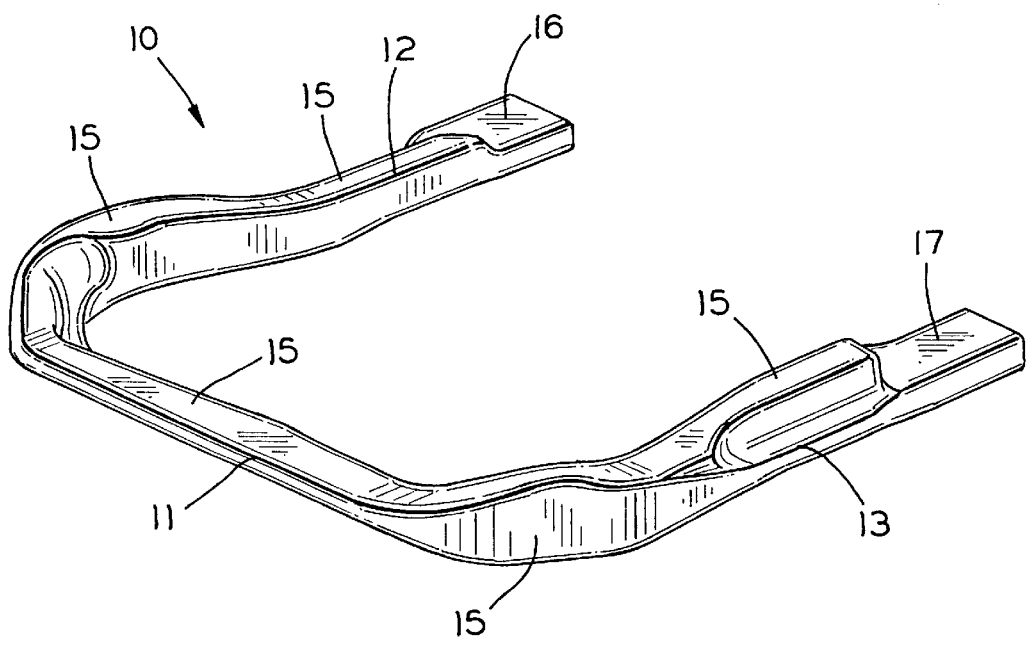
FIG. 4 is a perspective view of the hollow tubular member illustrated in FIG. 3 after the tubular ends have been removed to form the engine cradle.

As a result of this hydroforming process, the tubular member 10 is deformed into the desired final shape illustrated in FIG. 3. As shown therein, the hydroformed tubular member 10 has a number of flat regions 15 formed thereon during the hydroforming process to facilitate the attachment of various brackets (not shown) thereto. These brackets are used to secure the engine and other components of the vehicle to the hydroformed tubular member 10. The hydroformed tubular member 10 further has hollow rectangular regions 16 and 17, respectively, formed during the hydroforming process in the leg portions 12 and 13 adjacent to the ends 12a and 13a thereof. In a typical hydroforming apparatus, however, the ends 12a and 13a of the tubular member 10 extend outwardly from the die sections during the hydroforming process to facilitate the connection of sealing heads (not shown) thereto. The sealing heads are provided to seal the interior of the tubular member 10 to permit it to be filled with a pressurized fluid. One or both of the sealing heads is connected to a source of pressurized fluid for filing the tubular member 10 with fluid and pressurizing such fluid to expand the portion of the tubular member 10 contained between the die sections outwardly into conformance with the die cavity. As a result, the ends 12a and 13a of the legs 12 and 13, respectively, of the tubular member 10 which extend outwardly from the die sections are not deformed during the hydroforming process and, therefore, are maintained in their original hollow cylindrical shape. Following the hydroforming process, these tubular ends 12a and 13a are cut off or otherwise removed such that the legs 12 and 13 of the tubular member 10 terminate in the 10 hollow rectangular regions 16 and 17, respectively, as shown in FIG. 4. In this manner, the hollow tubular member 10 is formed into an engine cradle.

Figure 5:
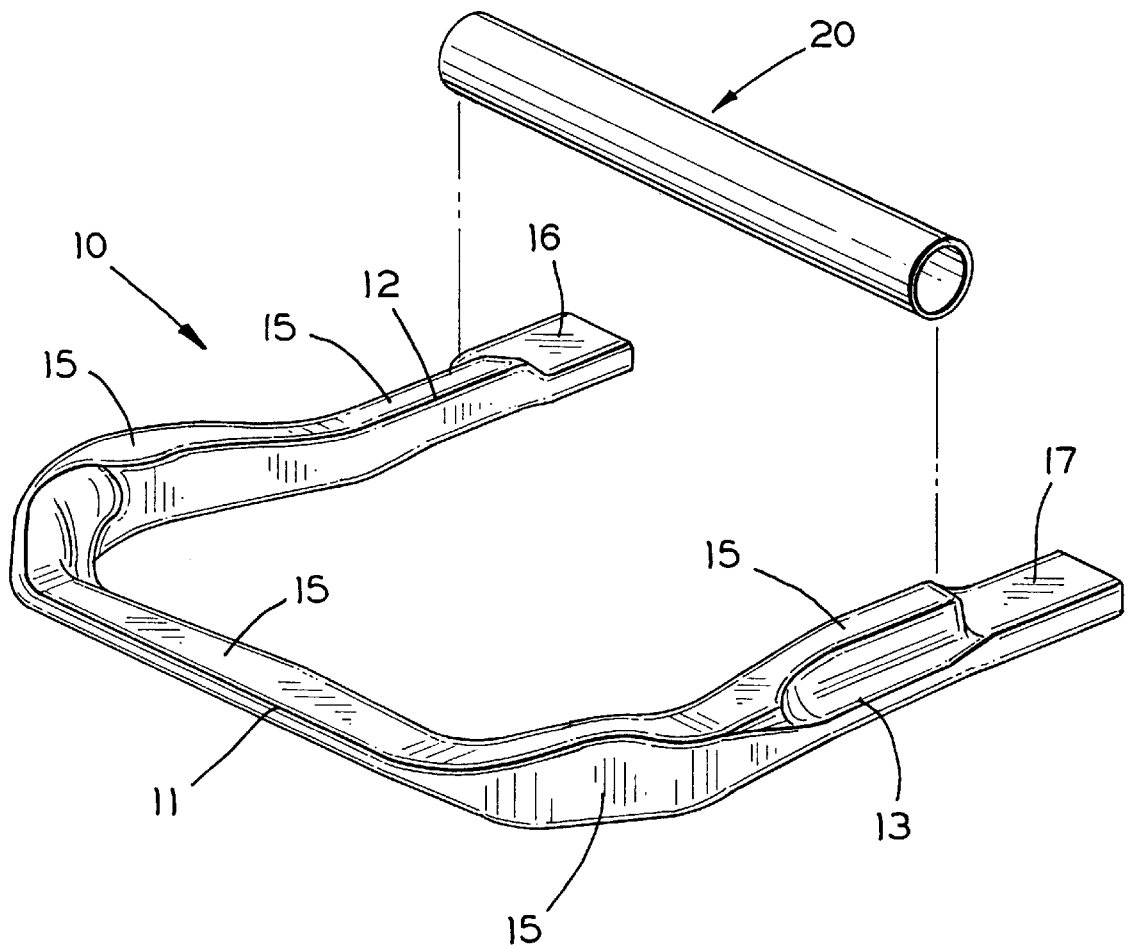
FIG. 5 is a perspective view of the engine cradle illustrated in FIG. 4 together with a hollow tubular member which can be used to form a cross member in accordance with this invention.

Referring now to FIG. 5, there is illustrated a hollow tubular member, indicated generally at 20, which can be used to form a cross member for the engine cradle 10 in accordance with this invention. Although the illustrated member 20 is tubular in cross sectional shape, it will be appreciated that the member 20 may be formed having other cross sectional shapes if desired. The tubular member 20 is preferably formed from a rigid deformable material, such as metal, having a length and wall thickness which is appropriate for the particular application for the cross member to be formed.

Figure 6:
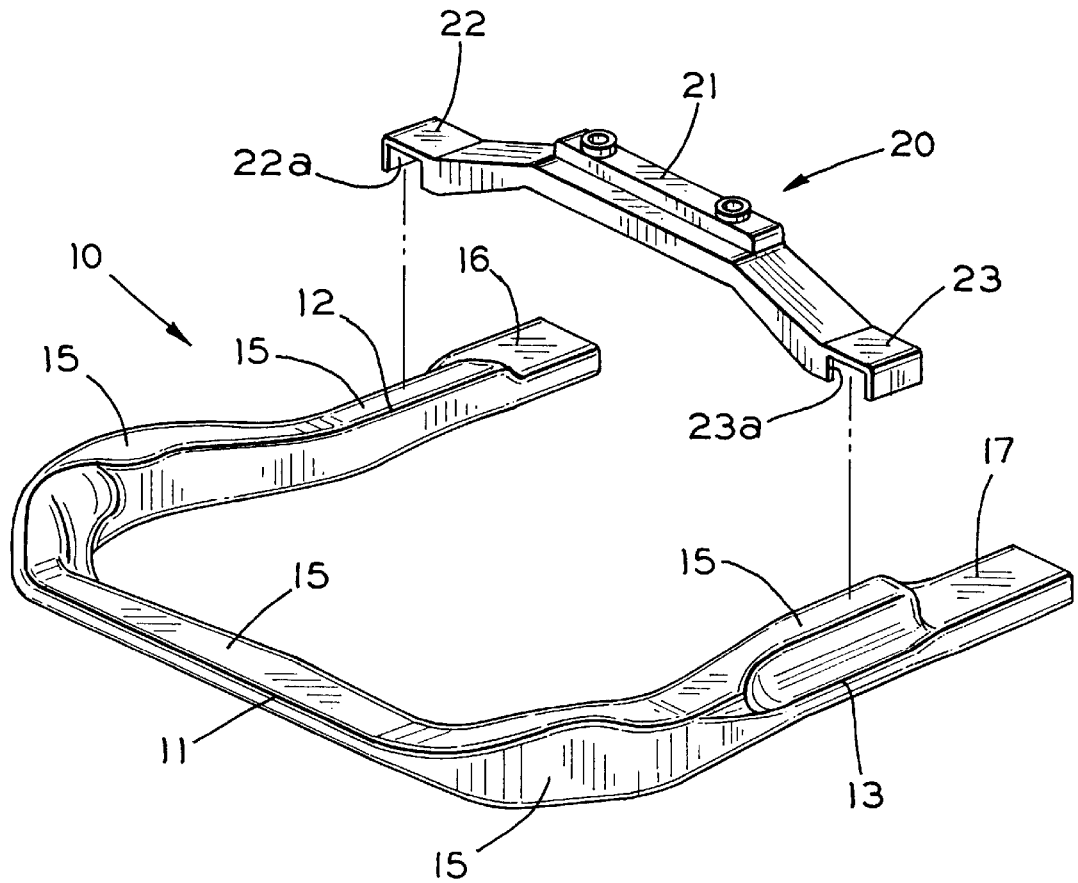
FIG. 6 is a perspective view similar to FIG. 5 after the hollow tubular member has been hydroformed to form the cross member.

The tubular member 20 is next subjected to a hydroforming process. As a result of this hydroforming process, the tubular member 20 is deformed into the desired final shape for the cross member illustrated in FIG. 6. As shown therein, the hydroformed cross member 20 is generally box-shaped and may have a generally flat central region 21 formed thereon during the hydroforming process to facilitate the securement of a portion of the vehicle engine (not shown) or other component thereto. The specific shape of the central region 21 of the cross member 20 will vary depending upon the particular application.

Figure 7:
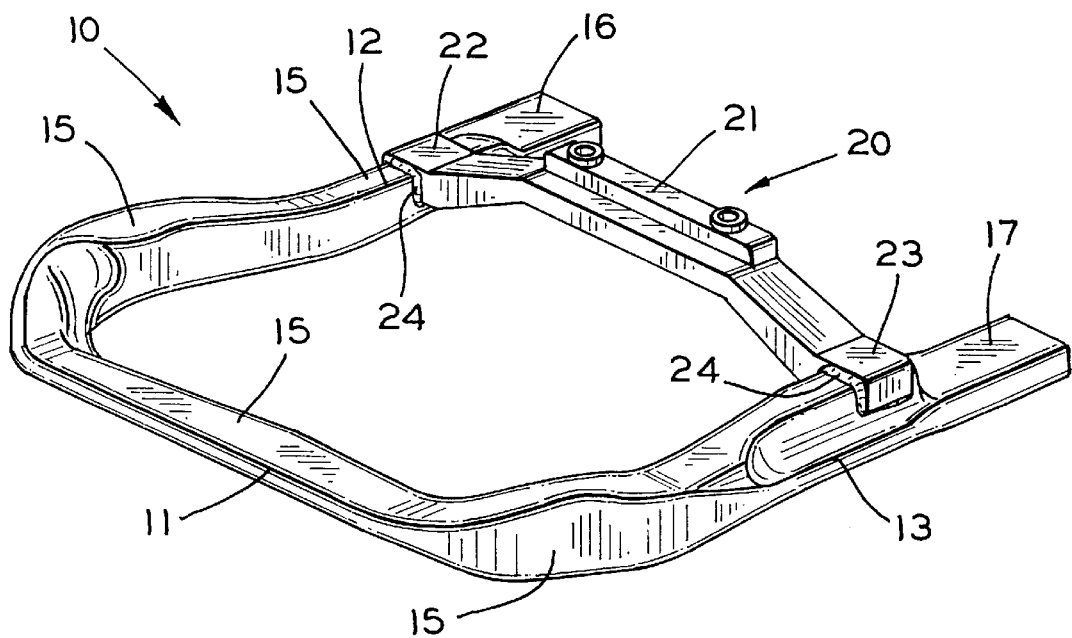
FIG. 7 is a perspective view showing the cross member secured to the engine cradle.

The hydroformed cross member 20 further has a pair of end portions 22 and 23 formed thereon. The end portions 22 and 23 are provided to connect the cross member 20 to a pair of the opposed flat regions 15 formed on the leg portions 12 and 13 of the engine cradle 10. To accomplish this, the end portions 22 and 23 may have notches 22a and 23a respectively formed in the lower surfaces thereof. The notches 22a and 23a may be formed in any conventional manner, such as by cutting. The notches 22a and 23a are preferably sized to fit snugly over the adjoining flat regions 15 of the leg portions 12 and 13 of the engine cradle 10. Then, the end portions 22 and 23 of the cross member 20 may be respectively secured by welds 24 to the leg portions 12 and 13 of the engine cradle 10, as shown in FIG. 7. However, the end portions 22 and 23 of the cross member 20 may be secured to the leg portions 12 and 13 of the engine cradle 10 by any conventional means.

The resultant combined engine cradle and cross member structure is desirable for several reasons. First, the use of the hydroforming process to form both the engine cradle 10 and the cross member 20 is desirable because the relatively complex structures can be formed quickly and easily. Second, by forming both the engine cradle 10 and the cross member 20 from tubular members using the hydroforming process, the necessary lateral and torsional rigidity is provided in the combined engine cradle and cross member structure, but at a significantly reduced weight than known structures which use flat stamped components for either the engine cradle 10 or the cross member 20.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A combined engine cradle and cross member structure for use with a vehicular body and frame assembly comprising:

an engine cradle formed from a hollow member and including a center portion having a pair of leg portions extending therefrom, said leg portions adapted to be connected to the vehicular body and frame assembly; and a cross member formed from a hollow member and including a pair of end portions secured to said leg portions of said engine cradle, wherein one of said end portions of said cross member has a notch formed therein, and wherein a portion of one of said leg portions of said engine cradle is received in said notch.

2. The combined engine cradle and cross member structure defined in claim 1 wherein said leg portions have respective flat regions formed thereon, and wherein said end portions of said cross member are secured to said flat regions of said leg portions.

3. The combined engine cradle and cross member structure defined in claim 1 wherein said engine cradle is generally U-shaped.

4. The combined engine cradle and cross member structure defined in claim 1 wherein both of said end portions of said cross member have notches formed therein, and wherein portions of both of said leg portions of said engine cradle are received in said notches.

5. The combined engine cradle and cross member structure defined in claim 1 wherein said end portions of said cross member are secured to said leg portions of said engine cradle by welding.

6. A method of manufacturing a combined engine cradle and cross member structure for use with a vehicular body and frame assembly comprising the steps of:

(a) providing an engine cradle formed from a hollow member and including a center portion having a pair of leg portions extending therefrom which are adapted to be connected to the vehicular body and frame assembly;

(b) providing a cross member formed from a hollow member and including a pair of end portions, wherein one of said end portions of said cross member has a notch formed therein; and (c) disposing a portion of one of the leg portions of the engine cradle in the notch.

7. The method of manufacturing a combined engine cradle and cross member structure defined in claim 6 wherein said step (a) is performed by hydroforming.

8. The method of manufacturing a combined engine cradle and cross member structure defined in claim 6 wherein said step (b) is performed by hydroforming.

9. The method of manufacturing a combined engine cradle and cross member structure defined in claim 6 wherein said steps (a) and (b) are performed by hydroforming.

10. The method of manufacturing a combined engine cradle and cross member structure defined in claim 6 wherein said step (a) includes forming flat regions on the leg portions, and wherein said step (c) includes securing the end portions of the cross member to the flat regions of the leg portions.

11. The method of manufacturing a combined engine cradle and cross member structure defined in claim 6 wherein said step (a) includes providing an engine cradle which is generally U-shaped.

12. The method of manufacturing a combined engine cradle and cross member structure defined in claim 6 wherein said step (b) includes forming notches in both of the end portions of the cross member, and wherein said step (c) includes disposing portions of both of the leg portions of the engine cradle within the notches.

13. The method of manufacturing a combined engine cradle and cross member structure defined in claim 6 wherein said step (c) includes welding the end portions of said cross member to the leg portions of said engine cradle.

* * * * *